(12) United States Patent
Wada

(10) Patent No.: US 9,083,671 B2
(45) Date of Patent: Jul. 14, 2015

(54) IMAGE FORMING APPARATUS, METHOD FOR CONTROLLING THE SAME, AND STORAGE MEDIUM

(75) Inventor: Katsuhiro Wada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 463 days.

(21) Appl. No.: 13/189,350

(22) Filed: Jul. 22, 2011

(65) Prior Publication Data
US 2012/0036570 A1   Feb. 9, 2012

(30) Foreign Application Priority Data

Aug. 3, 2010   (JP) .................................. 2010-174837

(51) Int. Cl.
| G06F 9/00 | (2006.01) |
| H04L 29/06 | (2006.01) |
| H04W 12/12 | (2009.01) |
| H04L 29/08 | (2006.01) |
| H04L 29/14 | (2006.01) |

(52) U.S. Cl.
CPC ............ *H04L 63/02* (2013.01); *H04L 63/1441* (2013.01); *H04L 67/02* (2013.01); *H04L 69/40* (2013.01); *H04W 12/12* (2013.01)

(58) Field of Classification Search
USPC .......................................................... 726/11
See application file for complete search history.

(56) References Cited

U.S. PATENT DOCUMENTS

| 2002/0085228 A1* | 7/2002 | Yagita ......................... 358/1.15 |
| 2002/0089692 A1* | 7/2002 | Ferlitsch ..................... 358/1.15 |
| 2003/0197887 A1* | 10/2003 | Shenoy et al. ............... 358/1.15 |
| 2005/0030580 A1* | 2/2005 | Moroi .......................... 358/1.15 |
| 2005/0193096 A1* | 9/2005 | Yu et al. ........................ 709/219 |
| 2007/0139702 A1* | 6/2007 | Sato et al. .................... 358/1.15 |
| 2007/0268517 A1* | 11/2007 | Koarai ......................... 358/1.15 |
| 2010/0302579 A1* | 12/2010 | Nuggehalli et al. ......... 358/1.15 |

FOREIGN PATENT DOCUMENTS

| JP | 2005047264 A | 2/2005 |
| JP | 2009044476 A | 2/2009 |

* cited by examiner

*Primary Examiner* — Nirav G Patel
(74) *Attorney, Agent, or Firm* — Canon USA, Inc., IP Division

(57) ABSTRACT

An image forming apparatus to communicate with a service provision system via a firewall may include an identification unit, a determination unit, and a communication unit. The identification unit identifies, out of services provided by the service provision system, a service which provides a substitute function corresponding to a function of the image forming apparatus limited by a failure. The determination unit determines, out of a plurality of communication methods to be used for communication with the service provision system via the firewall, a communication method to be used to perform data communication with the service identified by the identification unit. The communication unit performs data communication with the service identified by the identification unit by using the communication method determined by the determination unit.

15 Claims, 8 Drawing Sheets

IMAGE FORMING APPARATUS, METHOD FOR CONTROLLING THE SAME, AND STORAGE MEDIUM

BACKGROUND OF THE INVENTION

1. Field of the Invention

The present invention relates to an image forming apparatus, a method for controlling the image forming apparatus, and a storage medium.

2. Description of the Related Art

There are some conventional techniques related to an image forming apparatus with which a certain function is limited.

Japanese Patent Application Laid-Open No. 2009-44476 discusses a technique for determining, if a certain function of an image forming apparatus fails, functions related to the failure and disabling the functions to perform degenerate operation. Thus, other functions not related to the failure can be consecutively used by a user.

There is an invention that enables an image forming apparatus with which a certain function is limited, to use other image forming apparatuses. Japanese Patent Application Laid-Open No. 2005-47264 discusses a technique for enabling an image forming apparatus having a certain limited function to use functions of other image forming apparatuses. Thus, even if a user uses the image forming apparatus having a limited function, the user can obtain a desired result.

In recent years, a model called cloud computing has been attractive. Cloud computing is mainly characterized in that data conversion or data processing is performed in a distributed way by using a number of computing resources in order to simultaneously handle requests from a number of clients. Further, implementing various web services in a cloud computing environment achieving cloud computing enables providing diverse services to apparatuses that access the cloud computing environment.

SUMMARY OF THE INVENTION

An image forming apparatus to communicate with a service provision system via a firewall includes: an identification unit configured to identify, out of services provided by the service provision system, a service which provides a substitute function corresponding to a function of the image forming apparatus limited by a failure; a determination unit configured to determine, out of a plurality of communication methods to be used for communication with the service provision system via the firewall, a communication method to be used to perform data communication with the service identified by the identification unit; and a communication unit configured to perform data communication with the service identified by the identification unit by using the communication method determined by the determination unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Generally, a cloud computing environment exists on the Internet, and a client and the cloud computing environment communicate with each other via a firewall. In this case, since the firewall exists between the client and the cloud computing environment, the cloud computing environment (service provision side), serving as a source, cannot transmit data to the client (service reception side). The firewall has a function of blocking communication packets from the cloud computing environment as an outside environment.

Therefore, to receive data from the cloud computing environment, the client, serving as a source, needs to request the cloud computing environment to transmit data. In response to the data transmission request, the cloud computing environment transfers data to the client to achieve data communication between the client and the cloud computing environment via the firewall.

Conventionally, there has been no assumption, if a certain function of an image forming apparatus fails and a degenerate operation is obliged to be performed, that the cloud computing environment having the failed function is used.

In such a case, it is desirable for the client to use the cloud computing environment for the failed function to receive sufficient services. It is also desirable for the client to use the cloud computing environment by using a suitable communication method.

Embodiments are directed towards providing a substitute operation system on the assumption of such substitute operation, and more particularly to providing a substitute operation system in consideration of a method of communication between an image forming apparatus having a failed function and the cloud computing environment.

A first exemplary embodiment will be described below based on a system which receives from a service provision apparatus a service which provides a function equivalent to a function limited (disabled for example) by a failure occurring in an image forming apparatus.

Figure 1:
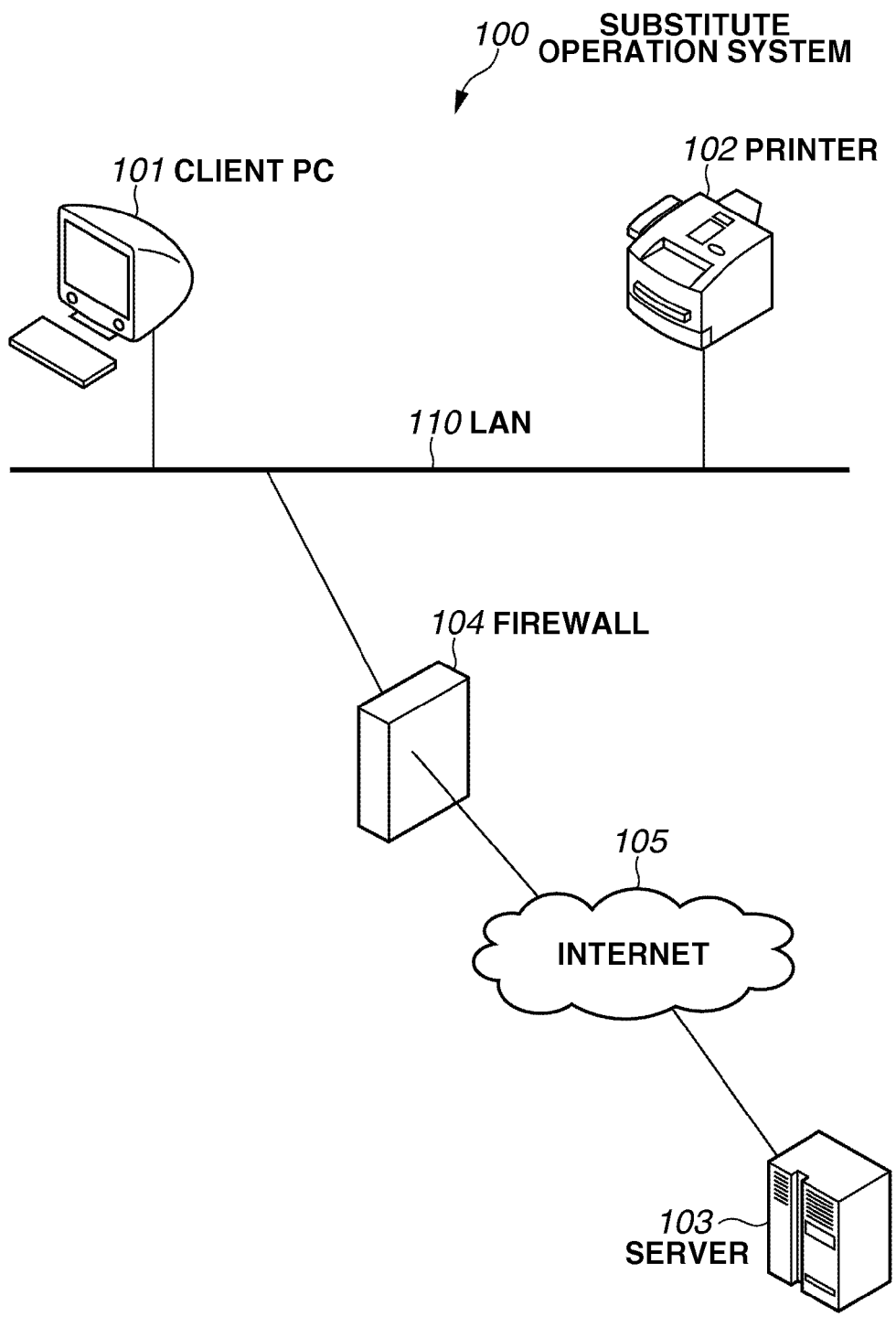
FIG. 1 illustrates an operating environment for a substitute operation system according to a first exemplary embodiment.

FIG. 1 illustrates an operating environment for a substitute operation system 100 according to the first exemplary embodiment. The substitute operation system 100 includes a client PC 101 and a printer 102 which are connected to a local area network (LAN) 110. The substitute operation system 100 further includes a server 103 which is connected to the LAN 110 via a firewall 104 and the Internet 105. Thus, the client PC 101 and the printer 102 can communicate with the server 103.

The server 103 according to the present exemplary embodiment is equivalent to the service provision system, and the printer 102 is equivalent to the image forming apparatus. In the present exemplary embodiment, since the server 103 operates on the assumption of a cloud computing environment, the server 103 employs a distribution and parallel processing model (for example, Hadoop) enabling scale-out of resources subjected to processing. Although one server 103 is illustrated in FIG. 1, the substitute operation system 100 may include a plurality of servers 103. In this case, for example, a plurality of server computers may be used on a virtualized basis to form one server 103.

Each of the client PC 101, the printer 102, and the server 103 holds an IP address to perform communication with other apparatuses. Similar to a print server function (Line Printer Deamon (LPD): Request for Comment (RFC) 1179) and the server 103, the client PC 101, in response to various requests, provides the printer 102 with services of server functions such as web, file, Simple Network Management Protocol (SNMP), web services (WS-) Eventing, etc.

The server 103 provides the printer 102 with a service in response to a request from the printer 102 (source of request). Services provided by the server 103 include server functions such as web services, storage services, image processing services, mail services, and so on. The server 103 may communicate with another server in response to a request from the printer 102 (source of request).

If the printer 102 fails, the printer 102 connects with the server 103 via the Internet 105 as required, and the server 103 performs suitable processing to normally process a printing request and a printer information acquisition request. Details will be described below.

Figure 2:
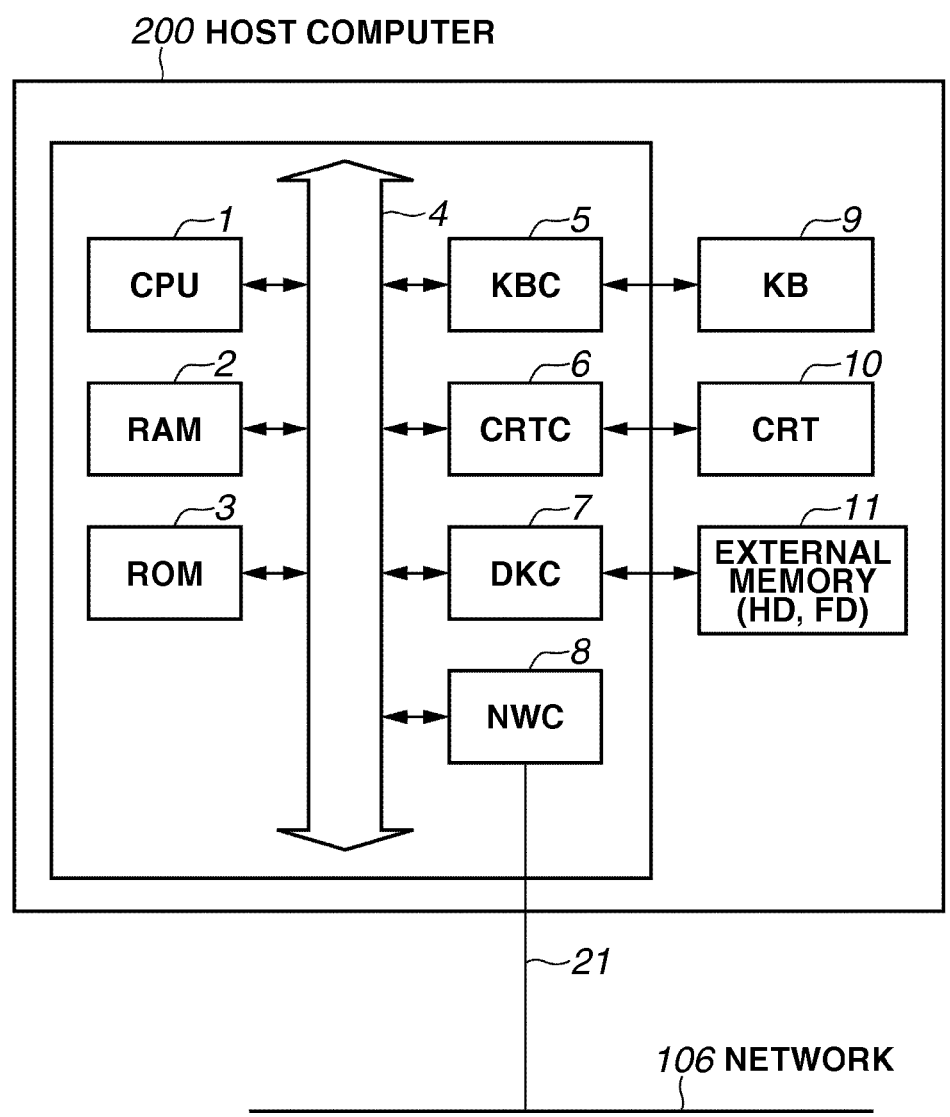
FIG. 2 illustrates an exemplary configuration of a client personal computer (PC) and a server according to the first exemplary embodiment.

FIG. 2 illustrates an exemplary configuration of the client PC 101 and the server 103 (host computers). In a host computer 200, a central processing unit (CPU) 1 totally controls each device connected to a system bus 4. Based on applications (document processing programs) stored in a program read-only memory (ROM) of a ROM 3 or an external memory (HD) 11, the CPU 1 performs document processing involving graphics, images, text, tables (including spreadsheets) etc. The CPU 1 performs rasterization processing of an outline font to a display RAM set on a random access memory (RAM) 2, and displays it on a display unit 10 via a cathode ray tube controller (CRTC) (display controller) 6.

Further, based on a command input by a pointing device (not illustrated) on the display unit 10, the CPU 1 opens various registered windows and performs various pieces of data processing. When using a client application or a server service, a user can open a window related to a relevant setting operation and make setting.

The RAM 2 serves as a main memory and a work area for the CPU 1. The ROM 3 includes a font ROM (not illustrated), a program ROM (not illustrated), and a data ROM (not illustrated). The font ROM and the external memory 11 store font data used when performing the above-mentioned document processing. The program ROM and the external memory 11 store an operating system (OS) which is a control program of the CPU 1. The data ROM and the external memory 11 store various types of data used when performing the above-mentioned document processing. A program stored in the external memory 11 is loaded into the RAM 2 at the time of execution.

A keyboard controller (KBC) 5 controls input information from a keyboard 9 and the pointing device (not illustrated). The CRTC 6 controls display on the display unit 10. A disk controller (DKC) 7 controls access to the external memory 11. A network controller (NWC) 8 is connected to a network 106 via a bidirectional interface 21. The keyboard 9 is provided with various keys. The display unit 10 displays graphics, images, text, tables, etc. The external memory 11 includes a hard disk (HD) or a floppy disk (FD). The external memory 11 stores a boot program, various applications, font data, user files, edited files, etc.

Figure 3:
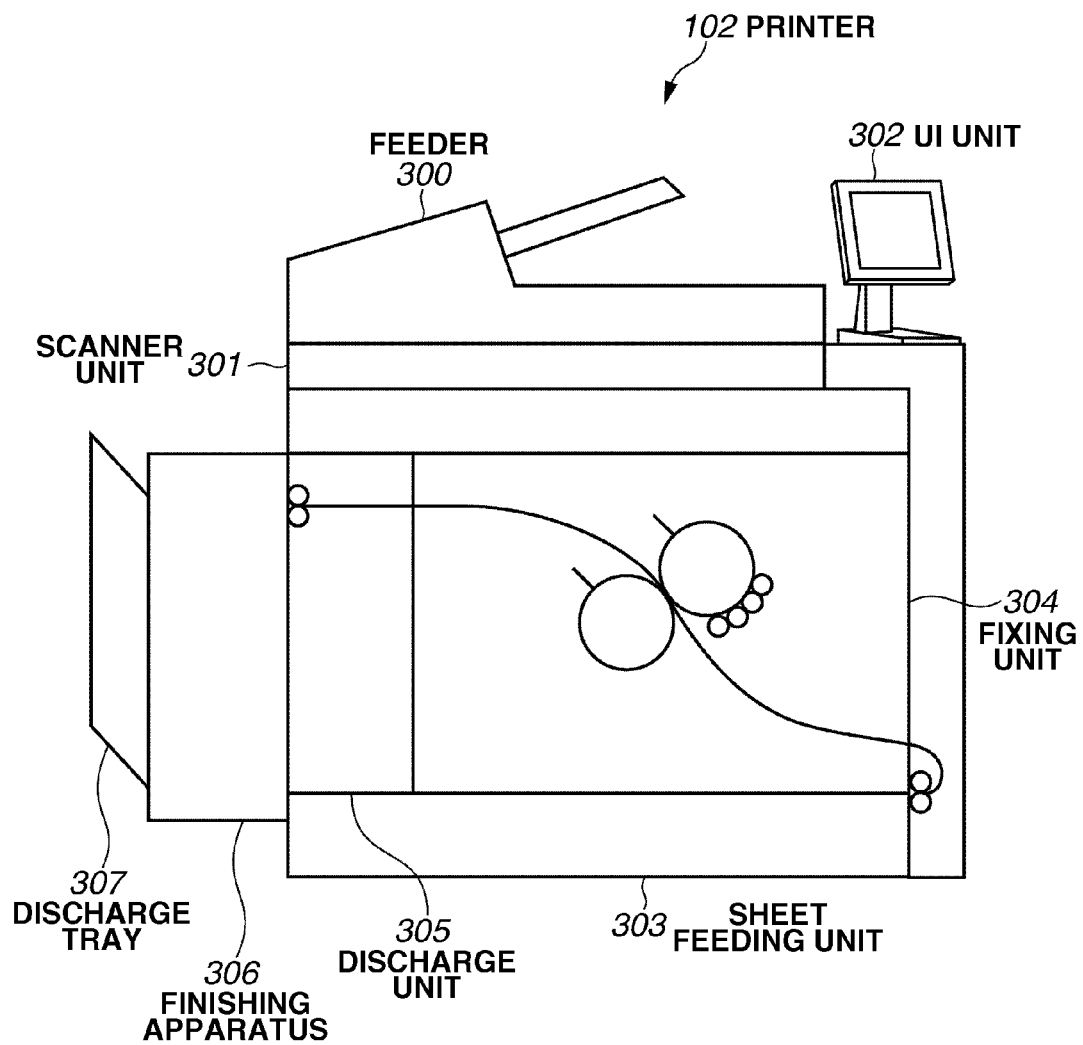
FIG. 3 illustrates an exemplary configuration of a printer according to the first exemplary embodiment.

Further, the printer 102 includes a scanner unit 301 for scanning a document, a feeder 300 for scanning a plurality of document sheets in response to a single instruction from the user (those of which are illustrated in FIG. 3), and a print engine (not illustrated) for printing a scanned document. Each of these units can exchange data with each component via the system bus 4.

FIG. 3 illustrates an exemplary configuration of the printer 102 illustrated in FIG. 1. The printer 102 (image forming apparatus) is a multifunction peripheral which provides functions of a copying machine, scanner, and facsimile in addition to a function of a printer which provides printing function.

The feeder 300 (automatic document feeder) automatically feeds document sheets when scanning a document at the scanner unit 301. The scanner unit 301 scans a paper document and converts scanned information into electronic form. A user interface (UI) unit 302 receives an operation input from the user, and suitably displays relevant information. A sheet feeding unit 303 feeds a print sheet to a fixing unit 304 at the time of printing. The fixing unit 304 fixes toner onto the print sheet conveyed from the sheet feeding unit 303 to perform printing. A discharge unit 305 discharges the print sheet that has undergone the fixing process by the fixing unit 304. A finishing apparatus 306 applies post-print processing such as stapling and punching to print sheets discharged from the discharge unit 305, according to order information. A discharge tray 307 holds a finished print product.

Figure 4:
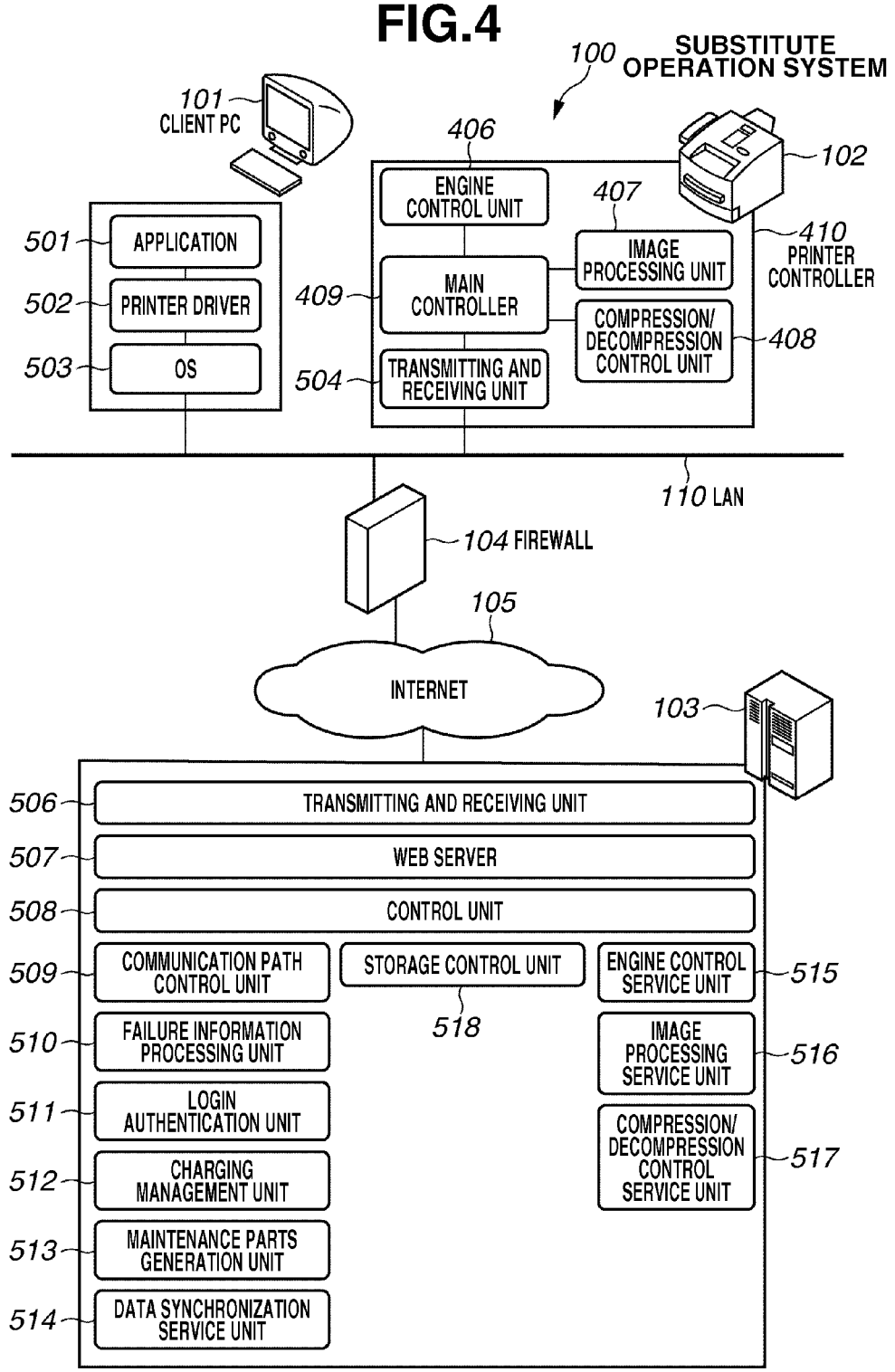
FIG. 4 illustrates a software configuration of the substitute operation system according to the first exemplary embodiment.

FIG. 4 illustrates a software configuration of the substitute operation system 100 according to the present exemplary embodiment.

First of all, the client PC 101 will be described below. An application 501 is software which operates on the client PC 101. The application 501 may be a word processor, spreadsheet, etc., each of which is stored in the ROM 3 or the external memory 11. The CPU 1 loads the application 501 into the RAM 2 and then executes it as required. A printer driver 502 generates print data applicable to the printer 102 in response to a print instruction from the application 501.

An OS 503 provides application software with an interface (hardware in abstract form) to enable the application software to perform data communication with each piece of hardware. Thus, application software can use, in the same way, hardware components of the client PC 101 coming from different manufacturers.

The printer 102 will be described below. Each function of the printer 102 is implemented when the CPU 1 loads a relevant program from the ROM 3 or a hard disk drive (HDD) 11 into the RAM 2 and then executes it. Each function of the printer 102 is also implemented by a dedicated application-specific integrated circuit (ASIC).

An engine control unit 406 issues an instruction to a printer engine to control the print sheet conveyance and the fixing unit 304. An image processing unit 407 applies rasterization (drawing processing) to print data to generate image data, and achieves image processing functions including color processing. A compression/decompression control unit 408 achieves a function of applying compression/decompression processing to the rasterized data.

A main controller 409 controls the engine control unit 406, the image processing unit 407, the compression/decompression control unit 408, etc. and monitors their statuses. A transmitting and receiving unit 504 issues a print instruction from the printer driver 502 on the client PC 101, and performs communication for information acquisition. If the printer 102 detects an error and the server 103 performs substitute processing, the transmitting and receiving unit 504 receives an instruction from the main controller 409 and data from a service that performs substitute processing.

The server 103 will be described below. Each function of the server 103 is implemented when the CPU 1 loads a relevant program from the ROM 3 or the HDD 11 into the RAM 2 and then executes it. The transmitting and receiving unit 506 performs data communication with the transmitting and receiving unit 504 by using a network interface (I/F) card (NWC) 8. A web server 507 is a web service server which performs data communication with the transmitting and receiving unit 504 by using the Hyper Text Transfer Protocol (HTTP) protocol, Representational State Transfer (REST) protocol, or Simple Object Access Protocol (SOAP) protocol. The web server 507 receives a request from the printer 102 and transfers it to a control unit 508. The web server 507 also transfers response information from the control unit 508 to the transmitting and receiving unit 506.

The control unit 508 performs control for invoking each processing unit (in the server 103) providing a service in response to a request from the printer 102. The control unit 508, the web server 507, and the transmitting and receiving unit 506 can process requests from printers (not illustrated) other than the printer 102 as one instance. To accommodate a number of printers 102, the server 103 is provided with a network load balancer (not illustrated) for holding a number of TCP sessions for a prolonged period of time.

A communication path control unit 509 maintains and controls a communication path necessary for the printer 102 to receive a service provided by the server 103, in response to an instruction from the printer 102. The printer 102 instructs the communication path control unit 509 to control the communication path (communication circuit) according to communication path statuses and communication limitations for the LAN 110, the firewall 104, and the Internet 105, and to the load status of the server 103. The printer 102 determines a communication path required for web services provided by the server 103 and configures the communication path via a communication path determination unit 606 and a communication path editing unit 607.

Figure 5:
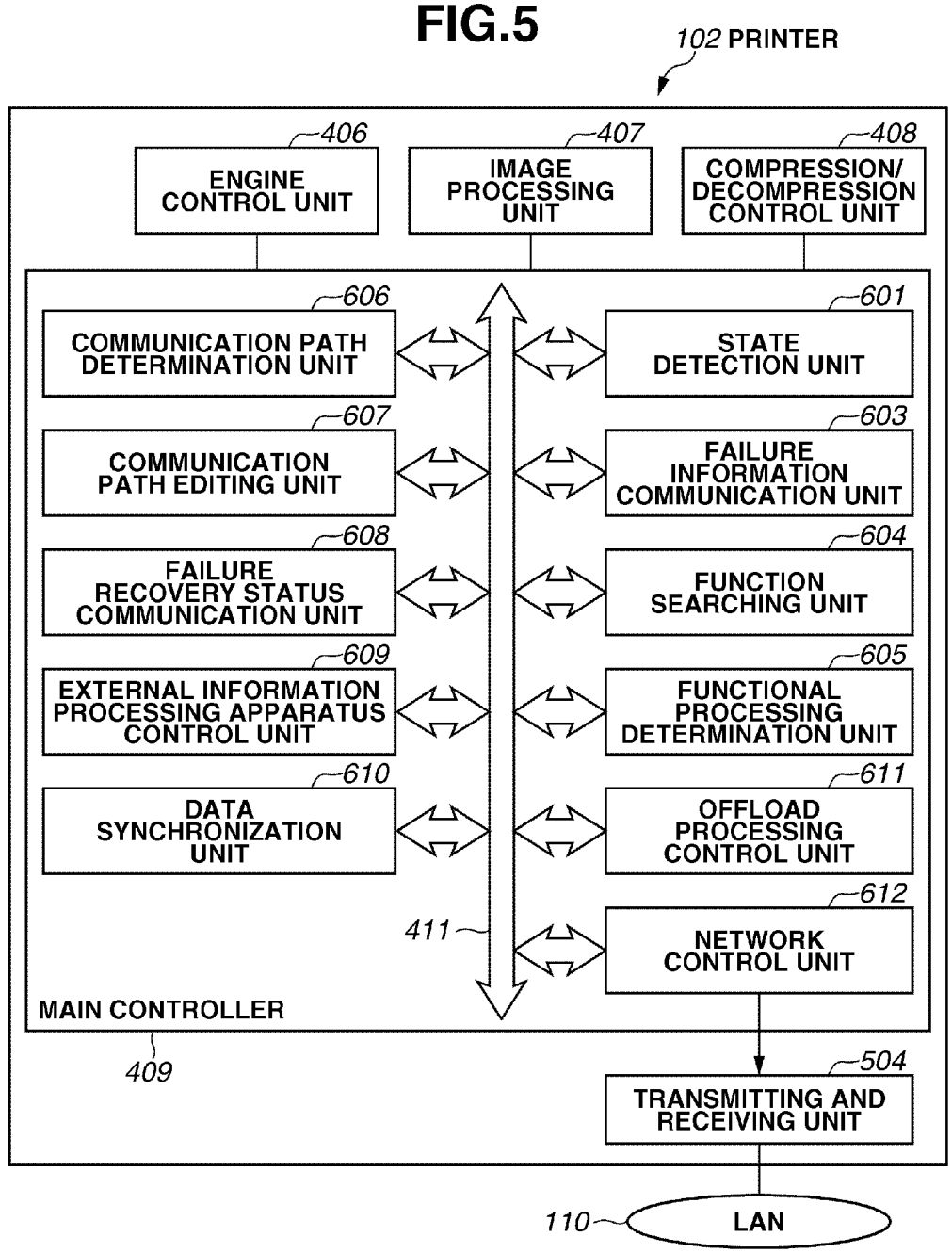
FIG. 5 illustrates a software configuration of the printer according to the first exemplary embodiment.

A failure information processing unit 510 communicates with a failure information communication unit 603 illustrated in FIG. 5 to locate an erroneous portion in the printer 102 and determine a service that the server 103 can provide the printer 102 with. A method for determination and details on configuration will be described in detail below. The communication path determination unit 606, the communication path editing unit 607, and the failure information communication unit 603 will be described in detail below. The failure information processing unit 510 communicates with the failure information communication unit 603 via the transmitting and receiving unit 506, and analyzes information about the error function of the printer 102.

A login authentication unit 511 processes a login request from the user of the printer 102 and from the client PC 103 using the printer 102. The login authentication unit 511 receives login request information via the control unit 508 and generates an authentication result. The login authentication unit 511 transfers to a charging management unit 512 access information as data subjected to charging.

The charging management unit 512 calculates a final bill on a pay-as-you-go basis based on the access information received from the login authentication unit 511. In the embodiments, the charging system is not limited to a certain charging system but is suitably determined.

A maintenance parts generation unit 513 generates maintenance parts for generating firmware and software packages for fixing a failed portion in the printer 102 based on information about the service provided by the server 103. Such maintenance parts are generated based on a database (machine-to-machine difference data, user-setting information, user data, model-specific firmware, optional unit information, etc.) for a service provided to the printer 102. The maintenance parts include firmware required by the printer 102 and relevant procedure documents. The maintenance parts generation unit 513 also performs license management and encryption processing for firmware and software.

The machine-to-machine difference data is model-specific data for the printer 102. The model-specific data includes calibration data and registration data such as dynamic and static data specific for the printer 102, including image formation, drawing, and color processing data.

The user-setting information includes information set in the printer 102 by the user. The information includes data set by the user or management by using the operation panel of the printer 102, the UI unit 302, an external management tool, or via the web services of the printer 102 or the web server.

The user data includes box data stored in the HDD 11, for example, at the time of reservation printing of the printer 102, and overlay form data used for form printing. The user data further includes temporary files for image processing generated at the time of printing, and temporary files used in other processing.

The model-specific firmware refers to firmware data for each model of the printer 102. Specifically, the model-specific firmware includes programs for the main controller 409 and the printer controller 410, and programs for application-specific hardware such as the engine control unit 406, the image processing unit 407, and the compression/decompression control unit 408. There is a plurality of firmware versions of the printer 102 by the date of shipment.

The optional unit information refers to data of optional units connected to the printer 102 and relevant firmware data. These pieces of data are managed by the server 103 as required.

A data synchronization service unit 514 communicates with a data synchronization unit 610 described below, installs in the printer 102 maintenance parts generated by the maintenance parts generation unit 513, and then performs synchronization processing for data generated by the service provided to the printer 102.

When a maintenance part is shipped to a user of the printer 102 by mail, it takes time until the maintenance part is installed. Therefore, various types of data at the time of maintenance part generation deviate from information about the service that is kept being provided by the server 103. Specifically, various types of data include machine-to-machine difference data, user-setting information, user data, model-specific firmware, and optional unit information. These pieces of data are highly likely to require synchronization.

Charging information of the charging management unit 512, user information of the login authentication unit 511, and user authority information are also highly likely to require synchronization. Firmware and software under license management need to be limited in simultaneous execution, for example, limited to one license. Therefore, it is necessary to perform synchronization processing for transferring to the printer 102 the license of web services provided by the server 103.

The data synchronization service unit 514 performs data synchronization from the server 103 to the printer 102. Even when the printer 102 is normally operating, the data synchronization service unit 514 performs data synchronization, periodically or when data changes, from the data synchronization unit 610 of the printer 102 to the data synchronization service unit 514 of the server 103. Thus, data to be lost at the time of a failure can be minimized.

By storing data of the printer 102 over a plurality of generations by the data synchronization service unit 514 of the server 103, a failure occurring at the time of firmware version upgrading of the printer 102 can be resolved by downgrading the firmware.

If the engine control unit 406, the image processing unit 407, or the compression/decompression control unit 408 in the printer 102 fails, an engine control service unit 515, an image processing service unit 516, or a compression/decompression control service unit 517 performs substitute processing for the former unit.

The engine control service unit 515 is a service which provides functions equivalent to the engine control unit 406. More specifically, the engine control service unit 515 issues an instruction to the printer engine in the image forming apparatus to control the print sheet conveyance and the fixing unit 304.

The image processing service unit 516 is a service which provides functions equivalent to the image processing unit 407. More specifically, the image processing service unit 516 performs rasterization processing based on a drawing instruction to generate a raster image. The image processing service unit 516 further performs various pieces of color processing and other processing based on engine-specific information.

The compression/decompression control service unit 517 is a service which provides functions equivalent to the compression/decompression control unit 408. More specifically, the compression/decompression control service unit 517 applies compression/decompression processing to drawing data. When performing image processing such as color conversion processing for drawing data, it is necessary to apply decompression processing to drawing data, load the drawing data into the RAM 2, and perform image processing.

If the image processing unit 407 fails, simply causing the image processing service unit 516 to perform substitute processing is questionable. This is because data transmission takes time if a broadband network such as a LAN is not ensured or if there exists a network limitation such as the firewall 104.

Even in a network environment where a broadband network such as the LAN 110 is ensured, the same problem will arise in a high-speed image forming apparatus, i.e., an image forming apparatus capable of printing a large number of sheets per unit time. Since color print data and print data containing a number of drawing objects have a large data size, data communication between the image processing service unit 516 and the compression/decompression control units 408 is time-consuming. As a result, very high load is applied to the CPU 1 of the communication band and the printer 102, degrading the efficiency.

In the first exemplary embodiment, the server 103 (a service provision system) is on the premise of a cloud computing environment so that communication cost rises in communication with the server 103. Since the communication cost increases with increasing transmission capacity, transmitting image data without compression is not advantageous for the user.

Therefore, when using the image processing service unit 516, the printer 102 searches for a service which provides functions equivalent to the compression/decompression control unit 408 even when the compression/decompression control unit 408 is not disabled. Causing the image processing service unit 516 and the compression/decompression control service unit 517 to perform substitute processing enables reducing the load on the communication band and the CPU 1, thus efficiently maintaining the performance of print output.

When the server 103 is based on a cloud computing environment, the CPU 1 of the server 103 generally has a larger amount of resources than the CPU 1 of the printer 102 does. From this viewpoint, it may be sometimes better to use a service of the server 103 although the printer 102 is normally operating.

In this way, if a certain function of the printer 102 fails, taking failure information and communication path information into consideration enables performing most suitable error processing by the server 103.

A storage control unit 518 has a function of storing data on behalf of the HDD 11 of the printer 102. The storage control unit 518 according to the present exemplary embodiment stores machine-to-machine difference data, user-setting information, user data, model-specific firmware, and optional unit information. This completes descriptions of functions of the substitute operation system 100.

FIG. 5 illustrates a software configuration of the printer 102 according to the first exemplary embodiment. A state detection unit 601 detects a failure of the printer 102 and identifies disabled functions and components. The state detection unit 601 further identifies functions and components which have restored to the normal state, after detecting the failure recovery. Information about trouble and recovery (failure information) is stored in the HDD 11 of the printer 102.

The failure information communication unit 603 communicates with the failure information processing unit 510 via the transmitting and receiving unit 504 to notify it of an erroneous portion of the printer 102 based on the failure information. The failure information communication unit 603 further notifies the failure information processing unit 510 of the use of a service that the server 103 can provide the printer 102 with.

A function searching unit 604 searches for a service of the server 103 usable by the printer 102, based on the failure information. Specifically, the function searching unit 604 searches for a service which provides a function equivalent to a disabled function, on a multicast basis.

A functional processing determination unit 605 determines whether the server 103 can perform on the printer 102 substitute processing for a certain function.

The communication path determination unit 606 determines a communication method to be used by the printer 102 to receive a service from the server 103. A method for determining a communication method will be described below. The communication path determination unit 606 can acquire from the server 103 a communication band, band limitations, communication delay time, whether bidirectional communication is performed, bidirectional communication method, event transmission method, event transmission delay time, usable protocol, usable port number, etc. The communication path determination unit 606 can further acquire setting information set by an administrator of the server 103. The setting information will be described in detail below.

The communication path editing unit 607 establishes a communication path between the printer 102 and the server 103, to be used by the printer 102 to receive a service from the server 103, based on a result of the determination by the communication path determination unit 606.

The communication path editing unit 607 according to the present exemplary embodiment establishes a communication path by using either of the following two communication methods. One method is a push method with which the service provision system (the server 103) holds a session with the image forming apparatus, maintains the state where the session is held, and returns a response via the session currently held when the service provision system responds. The other method is a pull method with which the image forming apparatus repetitively requests the service provision system for response and, when the image forming apparatus receives a response returned from the service provision system in response to the request, stops the repetitive requests. The communication method to be used by the printer 102 to communicate with the server 103 depends on a result of the determination by the communication path determination unit 606.

The characteristics of the two communication methods will be described below. Either of the two communication methods enables data transmitted from the server 103 to overpass the firewall 104 and be received by the printer 102.

The push method retains an established state of a session between the printer 102 and the server 103 until the server 103 returns a response to the printer 102. Therefore, the push method achieves communication with immediacy because a session is established at the time the server 103 returns a response. As a result, the printer 102 can acquire a response from the server 103 at an earlier timing. However, the push method constantly retains an established state of a session and therefore provides higher communication cost than the pull method.

In contrast, the pull method does not constantly retain an established state of a session between the printer 102 and the server 103. The printer 102 requests the server 103 to respond at predetermined intervals. Therefore, if the server 103 cannot respond, the printer 102 once terminates the session. Further, a fixed time period is required until the printer 102 accesses the server 103 next time. Therefore, the pull method cannot achieve communication with immediacy but provides lower communication cost than the push method.

Depending on the situation of the communication path, only the pull method can be employed. Such situation includes, for example, a case where a request from the printer 102 cannot overpass the firewall 104 because of a timeout setting for the firewall 104, and a case where the number of sessions from the printer 102 exceeds the maximum number of connections of the firewall 104. Information used when determining these factors includes not only setting information of the firewall 104 but also information sent from the server 103. In these cases, the push method cannot be employed.

Comet is a typical communication method employing the push method. Polling is a typical communication method employing the pull method.

A failure recovery status communication unit 608 notifies the server 103 of the fact that maintenance parts generated by the maintenance parts generation unit 513 have been installed in the printer 102 and a failure has been restored. Upon reception of this notification, the server 103 performs data synchronization with the printer 102. An external information processing apparatus control unit 609 controls the server 103 providing a service usable by the printer 102. The data synchronization unit 610 performs data synchronization after maintenance parts generated by the maintenance parts generation unit 513 have been installed in the printer 102. An offload processing control unit 611 controls processing by the printer 102 to cause the server 103 to perform substitute processing. A network control unit 612 performs control for communication with external devices.

The engine control unit 406, the image processing unit 407, and the compression/decompression control unit 408 have the function explained in FIG. 4.

As mentioned above, the present exemplary embodiment aims at causing the service provision system to perform substitute processing if these functions and other various functions are disabled. Therefore, the printer 102 causes the engine control service unit 515, the image processing service unit 516, and the compression/decompression control service unit 517 to perform substitute processing for the engine control unit 406, the image processing unit 407, and the compression/decompression control unit 408, respectively.

The above-mentioned services provided by the server 103 require immediacy in communication since these are to be used when a printing is requested from a user. It is natural that the user wants to acquire a requested print product as quickly as possible. Therefore, a service with which the user wants to quickly obtain a result, such as a printing request, is handled as a service requiring immediacy.

In contrast, in a case where a function of storing in the HDD 11 of the printer 102 image data of a document scanned by the printer 102 (a box function) is disabled, immediacy is not assumed to be required when receiving a data storage service of the server 103. Unlike a printing request, it is not likely that the user wants to immediately acquire data to be stored in the HDD 11.

The printer 102 preferably applies various pieces of processing to data corresponding to a plurality of document sheets scanned by the feeder 300, and establishes a session with the server 103 at the time communication is required. Therefore, a service not requiring immediate use of data is handled as a service not requiring immediacy. Data stored by the server 103 is stored by the storage control unit 518. This completes descriptions of functions of the printer 102.

Figure 6:
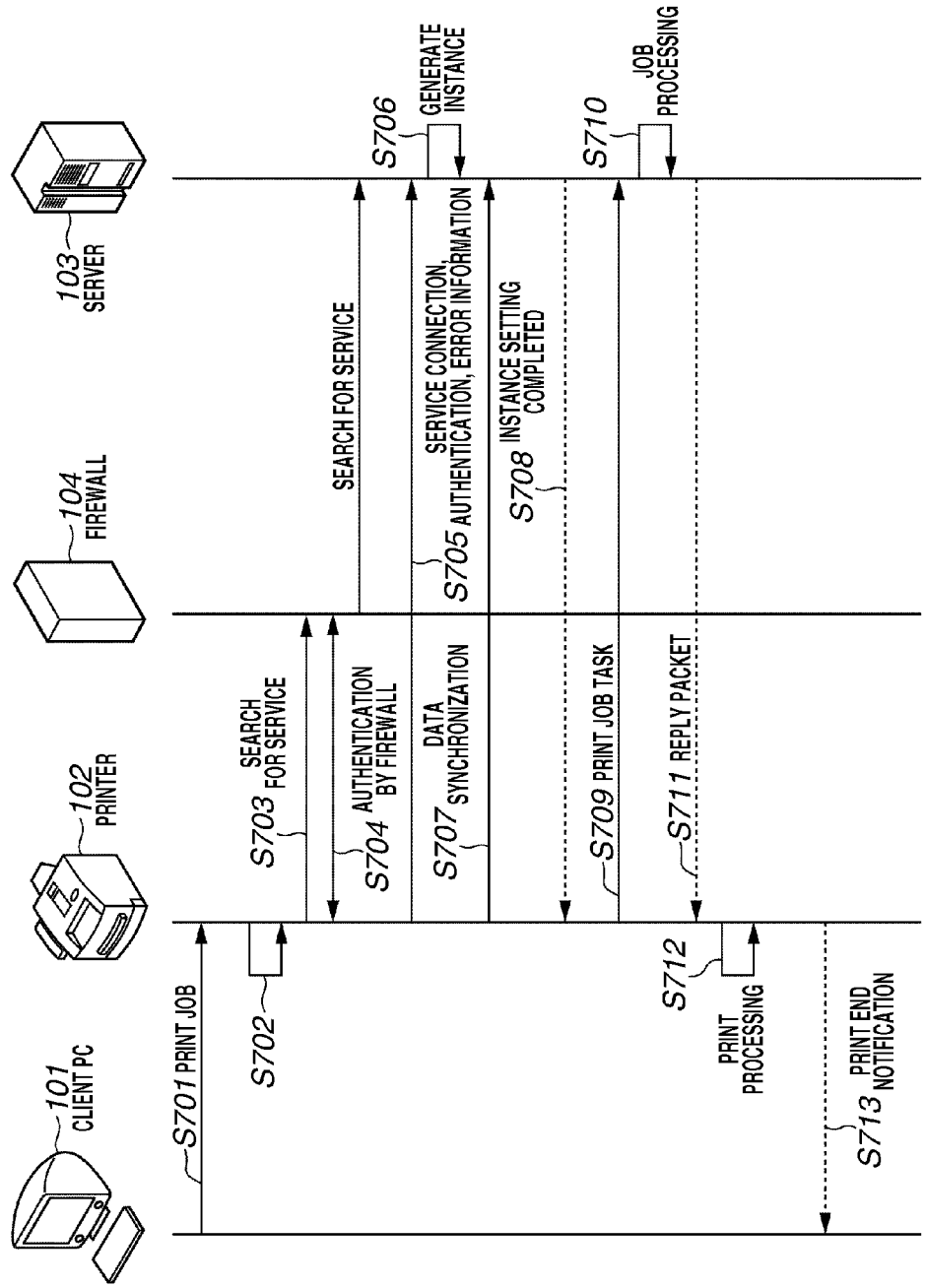
FIG. 6 is a flow chart illustrating processing in which the printer detects an error, receives a service from the server, and enables a user to acquire a desired result.

FIG. 6 is a flow chart illustrating processing in which the printer 102 detects an error, receives a service from the server 103, and the user acquires a desired result. In step S701, the client PC 101 transmits a print job to the printer 102. More specifically, the printer driver 502 receives a print instruction from the application 501 and transmits the print instruction to the printer 102 via a print spooler and a language monitor of the OS 503.

In step S702, the main controller 409 processes the print job received by the network control unit 612. The offload processing control unit 611 according to the present exemplary embodiment acquires, at this timing, information about a disabled function detected by the state detection unit 601 and identifies the disabled function.

The present exemplary embodiment will be described below based on a case where a failure occurs in the image processing unit 407. When the offload processing control unit 611 determines that continuation of print processing is not possible because of an error in the image processing unit 407, the offload processing control unit 611 instructs the functional processing determination unit 605 to select substitute processing. Error detection timing is not limited to printing. It should be emphasized that an error may be detected in advance, for example, through an event. The state detection unit 601 stores information about the detected error in the HDD 11 of the printer 102.

In step S703, the functional processing determination unit 605 instructs the function searching unit 604 to search for, in the server 103, a service capable of performing processing equivalent to the image processing unit 407 and the compression/decompression control unit 408. The reason why the printer 102 causes not only the image processing service unit 516 but also the compression/decompression control service unit 517 to perform substitute processing is as mentioned above. When the function searching unit 604 finds a target service in the server 103, it notifies the functional processing determination unit 605 of the service capable of performing processing equivalent to the image processing unit 407, i.e., the image processing service unit 516.

When searching for a service on the Internet, the function searching unit 604 does not need to directly communicate with the server 103 but may search for an endpoint or uniform resource identifier (URI) of the server 103 from a directory server.

Upon reception from the function searching unit 604 the fact that a service capable of performing substitute processing was not found, the functional processing determination unit 605 returns the fact to the offload processing control unit 611. The offload processing control unit 611 generates a dialog which enables the user to understand the fact that a service was not found, and instructs the UI unit 302 to display the dialog. Alternatively, the offload processing control unit 611 transmits the dialog to the client PC 101 to display it on its display.

In step S704, when the firewall 104 exists on the communication path between the printer 102 and the server 103, the firewall 104 authenticates the printer 102 which is a source of packet. Authentication information for the printer 102 is preset to the firewall 104. In addition to authentication information presetting, the firewall 104 can also communicate with an active directory server (not illustrated) to perform authentication.

The firewall 104 stores the authenticated IP address and port number, and permits communication from the same address. The firewall 104 permits communication also for a reply packet in the same session as a permitted packet. However, in communication from an outside environment via the firewall 104 performed without via a session established in response to a request from the printer 102, the firewall 104 discards the packet since it is not recognized as a reply packet.

In step S705, the functional processing determination unit 605 performs service connection authentication with the image processing service unit 516 and the compression/decompression control service unit 517. A user who uses the compression/decompression control service unit 517 performs service connection authentication with the server 103 via the client PC 101 or the printer 102. In the present exemplary embodiment, a communication method is determined in step S705. This determination method will be described in detail below. The communication path editing unit 607 establishes a communication path necessary to communicate with a service which provides a function equivalent to the identified disabled function. After the establishment of the communication path, the failure information communication unit 603 transmits failure information 602 to the server 103.

In step S706, the failure information processing unit 510 analyzes the failure information 602 and, based on a result of the analysis, the image processing service unit 516 and the compression/decompression control service unit 517 generate a new instance (a virtual printer instance).

In step S707, the data synchronization service unit 514 performs data synchronization between the firmware of the virtual printer instance, option information, user data, and device-specific information via the printer 102 and the established communication path. After the establishment of the communication path, the printer 102 transmits confirmation information for synchronization between these pieces of data to the server 103, and then the data synchronization service unit 514 executes step S707.

In step S708, the server 103 notifies the printer 102 of the fact that a virtual printer instance has been generated and virtual printer processing is enabled.

In step S709, the main controller 409 transmits to the server 103 data necessary to process the print job received in step S702.

In step S710, the image processing service unit 516 and the compression/decompression control service unit 517 apply image processing to the print job data transmitted in step S709.

In step S711, the server 103 returns a result of the image processing to the printer 102.

In step S712, the engine control unit 406 prints the received result of the image processing.

In step S713, the printer 102 displays a result of the print processing on the client PC 101. Processing in which the printer 102 detects an error, the printer 102 receives a service from the server 103, and the user acquires a desired result has been described above.

The method for determining a communication method by the communication path determination unit 606 will be described in detail below. Information about whether a service instructed to perform substitute processing requires immediacy in communication is managed in a table stored in the HDD 11 of the printer 102.

Figure 7:
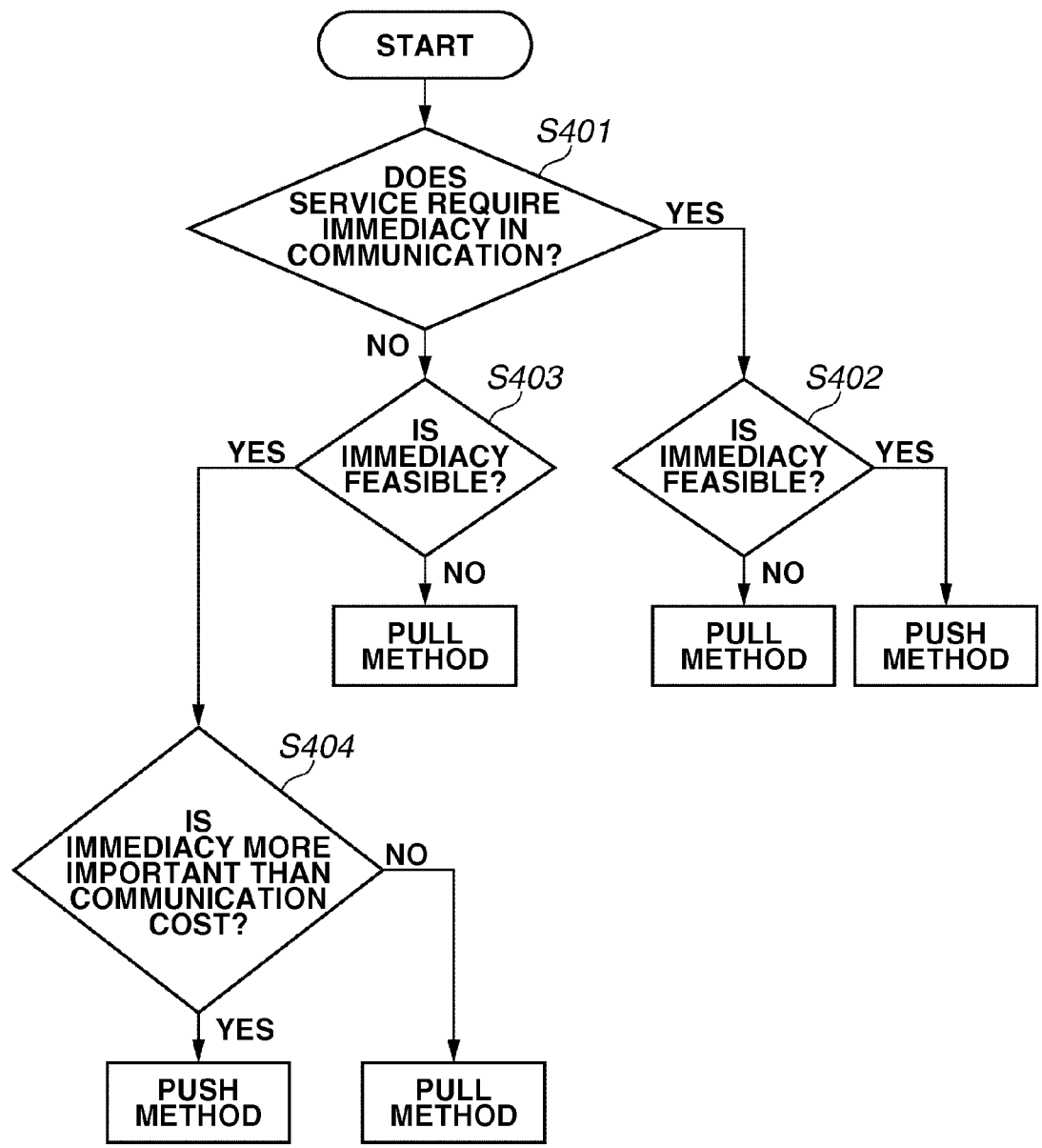
FIG. 7 is a flow chart illustrating processing performed by a functional processing determination unit according to the first exemplary embodiment to determine a communication method.

FIG. 7 is a flow chart illustrating processing performed by the communication path determination unit 606 to determine a communication method. In step S401, the communication path determination unit 606 determines whether the disabled service in the printer 102 requires immediacy in communication. When the disabled service requires immediacy, the processing proceeds to step S402. Otherwise, when the disabled service does not require immediacy, the processing proceeds to step S403.

In step S402, the communication path determination unit 606 determines whether immediacy is feasible with the communication path status. When immediacy is not feasible with the communication path status, the communication path determination unit 606 determines to adopt the pull method. On the other hand, when immediacy is feasible with the communication path status, the communication path determination unit 606 determines to adopt the push method. This means that, even if the target service requires immediacy, the pull method may be adopted depending on the communication path status.

In step S403, the communication path determination unit 606 determines whether immediacy is feasible with the communication path status. When immediacy is not feasible with the communication path status, the communication path determination unit 606 determines to adopt the pull method. On the other hand, when immediacy is feasible with the communication path status, the processing proceeds to step S404.

In step S404, upon reception of information about whether communication cost is considered more important than immediacy from the server 103, the communication path determination unit 606 determines whether communication cost is considered more important than immediacy. This information is equivalent to an instruction that the target service requires immediacy or not. The information about whether communication cost is considered more important than immediacy is stored in the HDD of the server 103, and set by the administrator of the server 103.

When immediacy is more important than communication cost, the push method is adopted. On the contrary, when communication cost is considered more important than immediacy, the pull method is adopted. Thus, even if the target service does not require immediacy, the push method may be adopted depending on the communication path status and the information set in the server 103 by the administrator.

Based on the communication method determined by the communication path determination unit 606, the communication path editing unit 607 establishes a communication path with the communication path control unit 509, enabling data communication between the server 103 and the printer 102. The communication path determination unit 606 determines a communication method based on whether the target service requires immediacy and on the communication path status, both.

According to the present exemplary embodiment, if a certain function of an image forming apparatus is disabled because of a failure, the image forming apparatus can properly communicate with a cloud computing environment having a service which provides a function equivalent to the failed function.

Specifically, when the target service requires immediacy in communication and immediacy is feasible with the communication path status, data communication is performed by a communication method employing the push method. When service requires immediacy in communication and immediacy is not feasible with the communication path status, priority is given to the communication path status and data communication is performed by a communication method employing the pull method. Further, when the service does not require immediacy in communication and immediacy is feasible with the communication path status, for example, a communication method is adopted according to a setting of an administrator of the cloud computing environment and data communication is performed by the adopted communication method.

When communication cost is considered more important than immediacy, the administrator can adopt a communication method employing the pull method. On the other hand, when immediacy is considered more important than communication cost, the administrator can adopt a communication method employing the push method.

In a second exemplary embodiment, a method for notifying of the change of a processing method will be described below. When the printer 102 detects a failure and causes the server 103 to perform substitute processing, the user selects whether substitute processing is to be performed. Descriptions of the elements similar to those in the first exemplary embodiment will not be repeated here.

In step S703, the functional processing determination unit 605 inquires of the user whether internal processing method is to be changed to an outside service because of a system failure occurrence. Thus, the user can select a processing method. An exemplary notification to the user is illustrated in FIG. 8.

Figure 8:
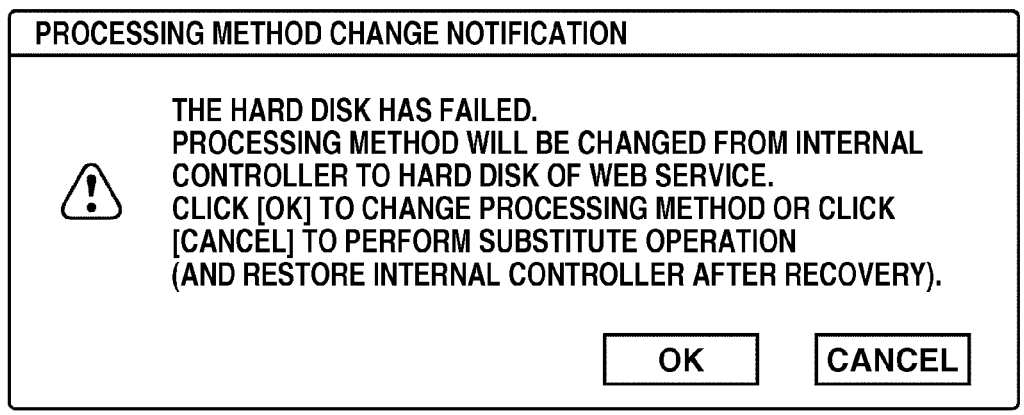
FIG. 8 illustrates a dialog inquiring of the user for whether the user will change processing method from an internal controller according to a second exemplary embodiment to a hard disk of a web service.

FIG. 8 illustrates a dialog inquiring of the user whether the processing method is to be changed from the HDD 11 of the printer 102 (target device), being in a failure state, to the HDD 11 of the server 103. When the user selects "OK", substitute processing is continued. When the user selects "CANCEL", the server 103 does not perform substitute processing.

Although some users may not want to store important data for security in the external server 103, the present exemplary embodiment can perform security processing suitable for such users.

The printer 102 notifies a service center and an IT administrator managing the printer 102 of an error and of the user's selection. The printer 102 issues such a notification to enable quickly maintaining a device.

Although the present invention has specifically been described in detail, the present invention is not limited thereto. Examples will be described below.

Although the IPv4 protocol is assumed in each exemplary embodiment, the embodiments are also applicable to other protocols including the IPv6 protocol. Further, embodiments are applicable even if connection between the client PC 101 and the printer 102 or between the printer 102 and the server 103 is established by a network other than LAN and the Internet, or other communication methods such as wireless LAN (such as IEEE802.11).

Each exemplary embodiment has specifically been described centering on engine control, image processing, and compression/decompression processing. However, embodiments are also applicable to other processing, for example, color management processing, font processing, LPD server processing, SNMP processing, web services on devices (WSD) processing, encryption/decryption processing, discharge unit control processing, sheet feeding unit control processing, web server processing, web service processing, search processing, storage management processing, log processing, etc.

Further, in each exemplary embodiment, the function searching unit 604 performs multicast search. However, the function searching unit 604 may perform any other search methods, for example, proactive search such as broadcast search and reactive search such as DNS and directory service. Further, combining the plurality of search methods may enable obtaining more number of search results.

In each exemplary embodiment, the function searching unit 604 is implemented by the printer 102. However, the function searching unit 604 may also be implemented by the server 103. In this case, the printer 102 transmits information about a failed function to the server 103, and the server 103 searches for therein a relevant service based on the transmitted information.

In each exemplary embodiment, either of the push and pull methods is selected as a communication method. However, in the embodiments, a communication method may be determined not only from these two communication methods but also from other ones. For example, Websocket is a communication method not included in the above-mentioned two communication methods. Further, the communication method may be changed during communication between the printer 102 and the server 103 on the assumption, for example, that the communication path status may change during communication therebetween.

Aspects can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium). In an example, a computer-readable medium may store a program that causes an image forming apparatus to perform a method described herein. In another example, a central processing unit (CPU) may be configured to control at least one unit utilized in a method or apparatus described herein.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-174837 filed Aug. 3, 2010, which is hereby incorporated by reference herein in its entirety.

What is claimed is:

1. An image forming apparatus to communicate with a service provision system via a firewall, the image forming apparatus comprising:
   a processor coupled to a memory;
   an identification unit configured to identify, out of services provided by the service provision system, a service which provides a substitute function corresponding to a function of the image forming apparatus limited by a failure;
   a determination unit configured to determine, based on the service identified by the identification unit, a communication method to be used to perform data communication with the service identified by the identification unit, wherein the communication method to be used is determined from a plurality of communication methods to be used for communication with the service provision system via the firewall; and
   a communication unit configured to perform data communication with the service identified by the identification unit by using the communication method determined by the determination unit, wherein the plurality of communication methods includes both:
   a push method with which the service provision system holds a session with the image forming apparatus, retains a state where the session is held, and returns a response via the held session, and
   a pull method with which the image forming apparatus repetitively requests the service provision system for response and, upon reception of a response returned from the service provision system in response to the request, stops the repetitive requests for response,
   wherein, in response to the service identified by the identification unit requiring immediacy in communication and immediacy in communication not being feasible with the communication path status, the determination unit determines the pull method, and
   wherein the identification unit, the determination unit, and the communication unit are implemented by the processor.

2. The image forming apparatus according to claim 1, wherein the determination unit determines, based on whether the service identified by the identification unit requires immediacy in communication, the communication method to be used to receive the service identified by the identification unit.

3. The image forming apparatus according to claim 2, wherein the determination unit determines, based on whether immediacy in communication is feasible with a communication path status, the communication method to be used to receive the service identified by the identification unit.

4. The image forming apparatus according to claim 3, wherein the determination unit determines, based on both whether the service identified by the identification unit requires immediacy in communication and whether immediacy is feasible with the communication path status, the communication method to be used to receive the service identified by the identification unit.

5. The image forming apparatus according to claim 1, wherein, in response to the service identified by the identification unit not requiring immediacy in communication and immediacy in communication not being feasible with the communication path status, the determination unit determines the pull method.

6. The image forming apparatus according to claim 5, wherein, in response to the service identified by the identification unit requiring immediacy in communication and immediacy in communication being feasible with the communication path status, the determination unit determines the push method.

7. The image forming apparatus according to claim 6, wherein, in response to the service identified by the identification unit not requiring immediacy in communication and immediacy in communication being feasible with the communication path status, the determination unit determines a communication method based on information about whether the image forming apparatus has received, from a service provision apparatus, an instruction that the service requires immediacy in communication.

8. The image forming apparatus according to claim 7, wherein, in response to the information received from the service provision apparatus being an instruction that the service requires immediacy, the determination unit determines the push method, and
   wherein, in response to the information received from the service provision apparatus being an instruction that the service does not require immediacy, the determination unit determines the pull method.

9. The image forming apparatus according to claim 8, wherein the function limited by a failure is an image processing function of drawing image data, and
   wherein both a service which provides a function equivalent to the image processing function limited by a failure, and a service which provides a function equivalent to a compression/decompression function of applying compression and decompression to the image data drawn by the image processing function are instructed to perform substitute processing to achieve data communication, even though the compression/decompression function of the image forming apparatus is not limited by a failure.

10. The image forming apparatus according to claim 1, further comprising:
    a printing unit; and
    a scanner unit,
    wherein the communication unit receives data communication from the service that has been processed through distribution and parallel processing.

11. The image forming apparatus according to claim 1, wherein, in response to a detection unit of the image forming apparatus detecting that a function of the image forming apparatus is limited by a failure, the image forming apparatus connects with the service provision system and transmits login request information to the service provision system before the identification unit identifies the service out of the services provided by the service provision system.

12. The image forming apparatus according to claim 11, wherein, in response to the detection unit of the image forming apparatus detecting that a function of the image forming apparatus is limited by a failure and before the image forming apparatus connects with the service provision system, a user inquiry is generated to determine whether substitute processing is to be performed.

13. The image forming apparatus according to claim 1, wherein the failure that limits function of the image forming apparatus is identified in failure information having information about trouble and recovery,
    wherein the identification of the service by the identification unit is based on the function of the image forming apparatus limited by the failure, and
    wherein the determination unit determines, based on the function of the image forming apparatus limited by the failure, the communication method to be used to perform data communication with the service.

14. A method for controlling an image forming apparatus to communicate with a service provision system via a firewall, the method comprising:
    identifying, out of services provided by the service provision system, a service which provides a substitute function corresponding to a function of the image forming apparatus limited by a failure;
    determining, using a processor coupled to a memory and based on the identified service, a communication method to be used to perform data communication with the identified service, wherein the communication method to be used is determined from a plurality of communication methods to be used for communication with the service provision system via the firewall; and
    performing data communication with the identified service by using the determined communication method, wherein the plurality of communication methods includes both:
    a push method with which the service provision system holds a session with the image forming apparatus, retains a state where the session is held, and returns a response via the held session, and
    a pull method with which the image forming apparatus repetitively requests the service provision system for response and, upon reception of a response returned from the service provision system in response to the request, stops the repetitive requests for response,
    wherein, in response to the identified service requiring immediacy in communication and immediacy in communication not being feasible with the communication path status, determining includes determining the pull method.

15. A non-transitory storage medium storing a program to cause a computer to execute a method for controlling an image forming apparatus to communicate with a service provision system via a firewall, the method comprising:
    identifying, out of services provided by the service provision system, a service which provides a substitute function corresponding to a function of the image forming apparatus limited by a failure;
    determining, using a processor coupled to a memory and based on the identified service, a communication method to be used to perform data communication with the identified service, wherein the communication method to be used is determined from a plurality of communication methods to be used for communication with the service provision system via the firewall; and
    performing data communication with the identified service by using the determined communication method, wherein the plurality of communication methods includes both:
    a push method with which the service provision system holds a session with the image forming apparatus, retains a state where the session is held, and returns a response via the held session, and
    a pull method with which the image forming apparatus repetitively requests the service provision system for response and, upon reception of a response returned from the service provision system in response to the request, stops the repetitive requests for response,
    wherein, in response to the identified service requiring immediacy in communication and immediacy in communication not being feasible with the communication path status, determining includes determining the pull method.

\* \* \* \* \*